Dec. 3, 1957   J. H. STAAK   2,815,458
DYNAMOELECTRIC MACHINE CONSTRUCTION
Filed Oct. 31, 1956
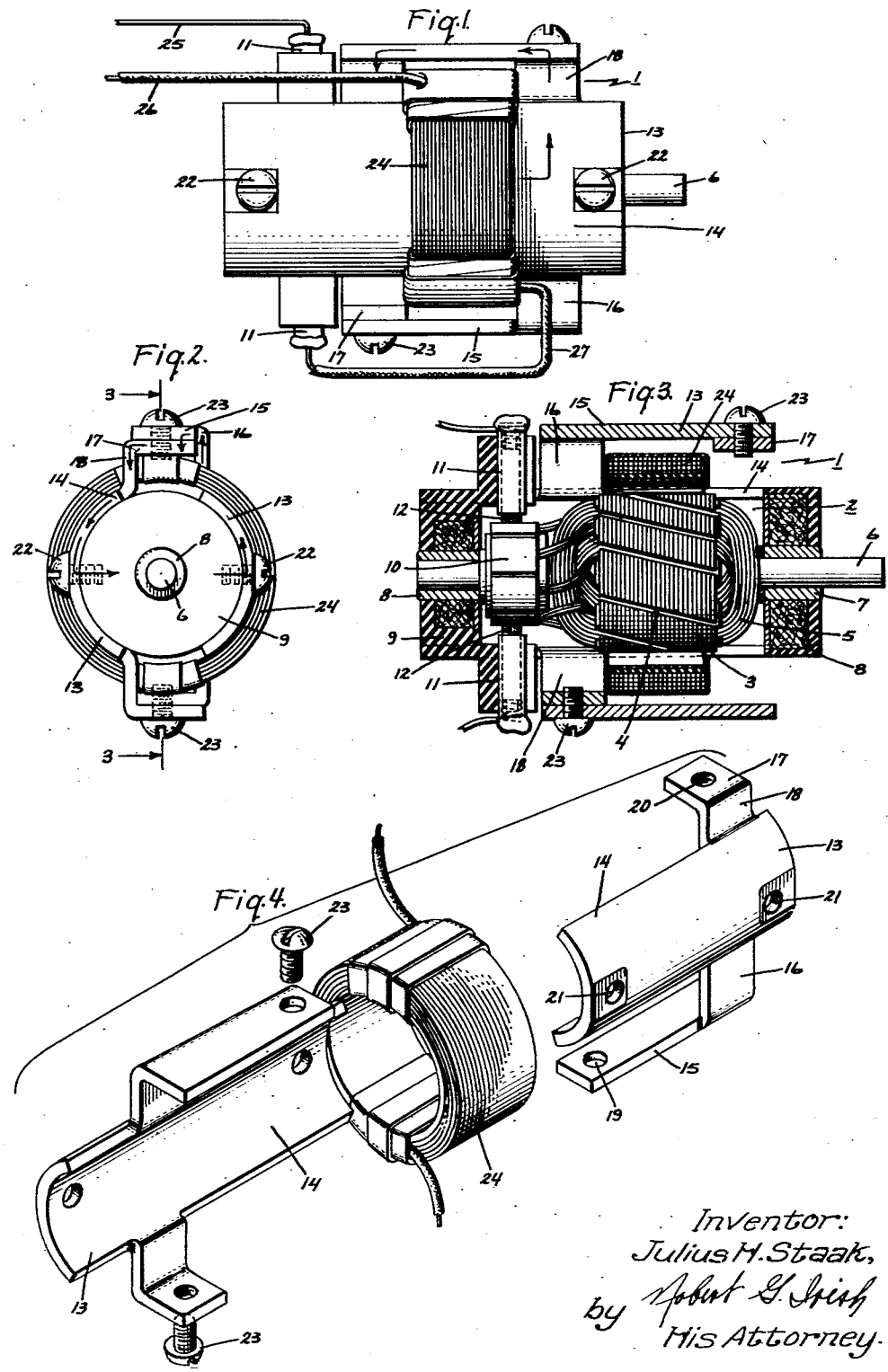
Inventor:
Julius H. Staak,
by Robert G. Irish
His Attorney.

United States Patent Office 2,815,458
Patented Dec. 3, 1957

2,815,458

DYNAMOELECTRIC MACHINE CONSTRUCTION

Julius H. Staak, Fort Wayne, Ind., assignor to General Electric Company, a corporation of New York Application October 31, 1956, Serial No. 619,578

2 Claims. (Cl. 310—40)

This invention relates to dynamoelectric machines and more particularly to small commutator-type machines.

At the present time, many applications are being discovered for commutator-type dynamoelectric machines, particularly direct current motors, where the output required from the machine is not particularly high, but the nature of the use requires that the cost of the machine be exceedingly low. For instance, in the automotive industry low-voltage direct-current motors are suitable for a great number of uses, such as the fuel pump operation, automatic operation of windows, etc. Despite the low cost necessary, the relative inaccessibility of the motors once they have been assembled requires that they be constructed ruggedly—to keep repairs to a minimum—and with the parts in accurately predetermined relationship for uniformity of performance.

It is further important that the number of elements of the machine be decreased to a minimum, with each of the remaining elements performing as many functions as possible as effectively as possible. Thus, the number of stator coils, which are expensive items to provide and assemble, should be kept to an absolute minimum; the total number of parts to the stator should be treated in the same manner without, however, sacrificing any of the concentricity and uniformity of airgap which is desirable between the stator and the rotor of the machine.

It is, therefore, an object of this invention to provide a commutator-type dynamoelectric machine, primarily for direct current use, which will have a simplified construction and will be exceedingly economical to manufacture.

It is a further object of this invention to provide a commutator-type dynamoelectric machine where the number of parts of the stator assembly is kept to an absolute minimum, with a single coil being sufficient.

It is a further object of this invention to provide a commutator-type dynamoelectric machine where each pole of the stator is formed from a unitary piece of magnetic material and where the poles cooperate with each other in such a way as to eliminate the need for a separate yoke piece to complete the magnetic flux path of the motor.

In one aspect thereof, the invention provides a commutator-type dynamoelectric machine including an inner rotatable member and an outer stationary member concentric therewith. The stationary member includes a plurality of pole pieces of magnetic material which are positioned about the rotatable member to form an airgap therewith. An annular coil is positioned about the pole pieces substantially coaxially with the rotatable member. Each of the pole pieces includes an integrally formed part which extends axially over the coil into engagement with an adjacent pole piece so as to complete a magnetic flux path without the requirement for an additional yoke piece.

The features of the invention which are believed to be novel are set forth with particularity in the appended claims. The invention itself, however, together with further objects and advantages thereof, may best be understood by reference to the following description taken in connection with the accompanying drawing.

In the drawing,

Figure 1 is a side view of a direct current motor incorporating the improved construction of this invention.

Figure 2 is an end view of the motor of Figure 1;

Figure 3 is a view along line 3—3 in Figure 2; and

Figure 4 is an exploded view in perspective of the stator member of the motor of Figures 1 through 3.

Referring now to the figures of the drawing, there is shown a direct current motor having a stationary member, or stator, generally indicated at 1 and a rotor member, or armature generally indicated at 2. Armature 2 includes a core 3 made up of laminations of magnetic material formed with slots 4 in which is positioned armature winding 5. The armature 2 also includes a shaft 6 which is supported by bearings 7 and 8 secured respectively within end shields 8 and 9 formed of non-magnetic material such as, for instance, molded plastic. Secured on shaft 6 to rotate with core member 3 is a commutator member 10 formed in any conventional manner of a plurality of segments of conductive material. A pair of brush holder members 11 are secured within end shield 9, and brushes 12 are positioned in the brush holders respectively with their ends in engagement with the segments of commutator 10 as shown.

The stator assembly 1 includes a plurality (two in the illustrative case) of pole pieces 13 of magnetic material. Each pole piece includes a main curved portion 14 which forms an airgap with the surface of armature core member 3, a wing-like projection 15 which is secured to portion 13 through extension 16, and a tab 17 which is secured to portion 13 by extension 18. Wing 15 and tab 17 have openings 19 and 20 respectively provided for a purpose which will appear hereafter.

Each pole piece 14 is provided with openings 21; the pole piece extends over both end shields 8 and 9 so that it may be secured to them in radial engagement therewith by means of threaded members 22 which extend through openings 21 into the end shields. It will readily be observed that pole pieces 13 are of a shape which permits them to be formed in their entirety from relatively inexpensive sheet stock by simple stamping and forming operations. The radial engagement of the pole sections 14 with the end shields 8 and 9 permits the airgap between the pole pieces and armature 2 to be accurately determined simply by turning down the end shield outer diameter to the desired bore diameter; this concept is more fully explained in applicant's issued Patent 2,683,830, assigned to the assignee of the present application.

When the pole pieces 13 are positioned about the armature 2 and secured to the end shields 8 and 9, as previously explained, the wing portion 15 of each pole piece 13 will lie against the tab portion 17 of the adjacent pole piece, with openings 19 and 20 of parts 15 and 17 respectively in alignment. Threaded members 23 extend through the openings 19 and 20 to secure the pole pieces together. It will, of course, be understood that openings 19 and 20 and threaded member 23 illustrate one common means of securing the two parts together; the important feature is that tap 17 and wing section 15 be secured to each other by any suitable means. Thus, for instance, a welding operation might well be substituted for the threaded engagement provided in the illustrated case.

An annular field coil 24, made up in the usual manner of a plurality of turns of magnet wire, is positioned coaxially with rotor 2 over the pole sections 14. The outer dimension of coil 24 is such that it fits within wing sections 15 which extend axially across the coil 24 when the assembly is completed. It will be observed that coil 24 is of a type which is exceedingly simple to manufacture, and that one single coil extends over all the pole sections 14 so that, upon energization of the coil, the proper flux pattern will be created in each pole. When assembled, coil 24 is positioned axially between tab 17 and the junction of pole section 13 and extension 16.

In the illustrated example which shows coil 24 connected as a series field, a lead 25 connects one of the brushes 11 to one side of a source of direct current power, a lead 26 connects coil 24 to the other side of the source, and a lead 27 completes the electrical connections, extending between the other brush 11 and the other end of coil 24. When direct current power is supplied across leads 25 and 26, coil 24 is energized. The direction of winding of the turns of coil 24 causes a tendency for one axial end of each pole to become a north pole and the other axial end to become a south pole. In order to counteract this tendency and create opposite polarity in the two separate pole pieces, it is necessary to provide complete flux paths about the coil which also link each pole to its adjacent pole. This is effected by the construction which has been described, as will be seen by reference to the arrows provided in Figures 1 and 2 to illustrate the flux pattern. Starting at the center of one of the pole sections 13, the flux travels across the airgap, through the armature 2, into the other pole section 13, up through extension 16, through wing section 15 to tab 17, down through portion 18, and into the first pole section 13 back to its point of origin. Thus, the necessary closed flux paths about the coil is provided while at the same time including a radially extending pattern in order to provide the necessary forces upon the rotor 2. It will be understood that two identical such patterns are provided, each one extending through oppositely positioned wing sections 15.

While a direct-current series motor has been described, it is readily conceivable that such a machine might be used with alternating current, formed as a direct current generator, or connected with a shunt field, as will be readily apparent to those skilled in the art.

It will be seen that by the particular shape of each pole piece 13, and by the special relationship between them made possible by that shape, the number of parts of the motor is reduced to a minimum with a single annular coil being sufficient to provide the necessary field flux in the poles. An important provision of the invention lies in forming on each pole piece a wing section which extends across the coil into engagement with the other pole piece so as to complete the flux path about coil 24. It will, of course, be apparent that while a wing section which is completely axial has been illustrated, the wing section 15 may be made to slant across the coil 24 if so desired, the important feature being that a single path between adjacent pole pieces is provided which completes a flux path about the coil.

While the invention has been explained by describing a particular embodiment thereof, it will be apparent that improvements and modifications may be made without departing from the scope of the invention as defined in the appended claims.

What I claim as new and desire to secure by Letters Patent of the United States is:

1. A dynamoelectric machine including an inner rotatable member having a shaft extending therefrom at each end; a pair of non-magnetic end shields respectively positioned at each end of said rotatable member, said shaft being rotatably supported by said end shields; and an outer stationary member concentric with said inner rotatable member comprising a plurality of pole pieces of magnetic material each having an axially extending pole section secured at each end to an end shield, said pole sections being positioned about said rotatable member in circumferentially spaced relation to each other to form an airgap with said rotatable member, and an annular field coil member positioned about said pole pieces substantially concentrically with said rotatable member, each said pole piece including an integrally formed wing section joined at one end to the remainder of said pole piece extending axially over said coil into engagement with an adjacent pole piece.

2. A dynamoelectric machine including an inner rotatable member having a shaft extending therefrom at each end; a pair of end shield members of nonmagnetic material positioned at each end of said rotatable member, said shaft being rotatably secured within each of said end shield members; and an outer stationary member concentric with said rotatable member comprising a plurality of pole pieces of magnetic material each having a pole section extending axially and secured at each end to an end shield, said pole sections being positioned about said rotatable member in circumferentially spaced relation to each other to form an air gap with said rotatable member, and an annular field coil member positioned about said pole pieces substantially concentrically with said rotatable member, each said pole piece including an integrally formed wing section joined at one end to the remainder of said pole piece and extending substantially axially over said coil each said pole piece further including an integrally formed tab positioned radially outwardly of the pole section on the other axial side of said coil from the junction of said pole section and said wing section, the wing section of each pole piece extending axially over said coil into engagement with the tab section of the adjacent pole piece.

References Cited in the file of this patent

UNITED STATES PATENTS 2,212,192    Howell _____ Aug. 20, 1940